United States Patent Office 2,874,149
Patented Feb. 17, 1959

2,874,149

UREAS

Fred Applegath and Raymond A. Franz, El Dorado, Ark., assignors to Monsanto Chemical Company, St. Louis, Mo., a corporation of Delaware No Drawing. Application March 18, 1957
Serial No. 646,582

8 Claims. (Cl. 260—77.5)

This invention relates to ureas and more particularly to the preparation of polymeric and cyclic ureas. It is an object of this invention to provide an entirely new process for preparing cyclic and polymeric ureas. A particular object of this invention is to provide a process for preparing cyclic and polymeric ureas from carbon monoxide, sulfur and organic diamines. Other objects will become apparent from the description of this invention.

It has now been discovered that cyclic and polymeric ureas can be prepared by reacting at an elevated temperature carbon monoxide, sulfur and an organic compound selected from the group consisting of organic compounds containing at least two —$NH_2$ substituent radicals and organic compounds containing at least two —$NH_2$ substituent radicals and at least one —NH— substituent radical. Such compounds are hereinafter referred to as organic diamines. The position of the amino groups with respect to each other in the organic diamine determines the type of urea formed in accordance with this invention. In the case of aromatic organic diamines, cyclic ureas (imidazoles) are formed when the substituent radicals referred to above are attached to adjacent aromatic carbon atoms, that is, are in the ortho position with respect to each other, and polymeric ureas are formed when the substituent radicals referred to above are attached to aromatic carbon atoms which are not adjacent to each other, for example, are in the meta or para position with respect to each other. In the case of aliphatic organic diamines, cyclic ureas (imidazoles) are formed when the substituent radicals referred to above are attached to separate carbon atoms in the same chain which carbon atoms are linearly separated from each other by not more than three atoms and polymeric ureas are formed when the substituent radicals referred to above are attached to separate carbon atoms in the same chain and which carbon atoms are linearly separated from each other by more than three atoms. The following examples illustrate the invention:

EXAMPLE I

Thirty grams of ethylenediamine, 16 g. of sulfur and 300 ml. of methanol were charged to 1.8 l. stainless steel oxygen bomb. Carbon monoxide was introduced into the bomb until a pressure of 130 p. s. i. g. was obtained. The bomb was closed and heated, maintaining a temperature of approximately 100° C. for two hours. The bomb was then allowed to cool, the $H_2S$ vented from the bomb and the contents removed by rinsing with methanol. The mixture was cooled and precipitated sulfur removed by filtration. The filtrate was evaporated to a volume of about 75–100 ml., cooled thereby precipitating dihydroimidazolone which was removed by filtration. Approximately 22.4 g. of dihydroimidazolone were obtained, having a melting point of 128°–90° C., representing a 58% yield. Dihydroimidazolone is represented by the following formula:

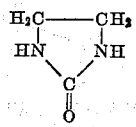

EXAMPLE II

The procedure set forth in Example I was repeated using 20 g. of 1,2-propylenediamine, 8.65 g. sulfur, 200 ml. of methanol and an amount of CO sufficient to pressure the bomb to 75 p. s. i. g. A 77% yield of 4-methyl-dihydro-2-imidazolone, having a melting point of 119°–121° C., was obtained. 4-methyldihydro-2-imidazolone is represented by the following formula:

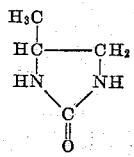

EXAMPLE III

The procedure set forth in Example I was repeated using 20 g. of 1,3-diamino-2-propanol, 7.12 g. of sulfur, 200 ml. of methanol and an amount of CO to pressure the bomb to 95 p. s. i. g. In this case the reaction was run for 20 minutes at 120° C. A 65% yield (16.8 g.) of 5-hydroxy-2-tetrahydropyrimidone, having a melting point of 208°–210° C., was obtained. 5-hydroxy-2-tetrahydropyrimidone is represented by the following formula:

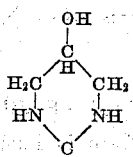

EXAMPLE IV

The procedure set forth in Example V was repeated using a two gallon stainless steel autoclave, 396 g. of 1,4-diaminobutane, 144 g. of sulfur, 3800 ml. of methanol and an amount of CO to pressure the autoclave to 375 p. s. i. g. The reaction was carried out for 2 hours at 100° C. A 54.6% yield (280 g.) of tetramethyleneurea, having a melting point of 165°–166° C., was obtained. Tetramethyleneurea is represented by the following formula:

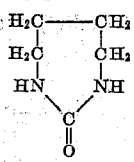

EXAMPLE V

The procedure set forth in Example I was repeated using 10 g. of pentamethylenediamine, 3.14 g. of sulfur, 400 ml. of methanol and an amount of CO to pressure the autoclave to 100 p. s. i. g. The reaction was carried out at 120° C. for 2 hours. An 89.4% yield (11.15 g.) of pentamethyleneurea, having a melting point of 263°–

265° C., was obtained. The pentamethyleneurea thus obtained had the following chemical analysis:

|  | Carbon | Hydrogen | Nitrogen |
|---|---|---|---|
|  | Percent | Percent | Percent |
| Calculated for: $C_6H_{12}N_2O$ | 56.22 | 9.44 | 21.86 |
| Actual | 56.44 | 9.53 | 21.96 |

Pentamethyleneurea is represented by the following formula:

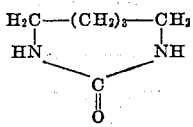

EXAMPLE VI

The procedure set forth in Example I was repeated using a 1 liter autoclave, 25 g. of o-phenylenediamine, 14.8 g. of sulfur, 2.4 g. of triethylamine, 50 ml. of pyridine and an amount of CO sufficient to pressure the autoclave to 200 p. s. i. g. The reaction was carried out for 3½ hours at 115° C. A 90% yield (27.8 g.) of benzimidazolone was obtained having a melting point of 303°–307° C. Benzimidazolone is represented by the following formula:

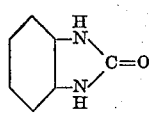

EXAMPLE VII

The procedure set forth in Example I was repeated using a 20 g. of triethylenetetramine, 8.77 g. of sulfur, 200 ml. of methanol and an amount of CO to pressure the bomb to 70 p. s. i. g. The reaction was carried out for 2 hours at 120° C. A 57% yield (15.3 g.) of 1,1'-ethylene-bis-2-imidazolone was obtained having a melting point of 240°–242° C. 1,1'-ethylene-bis-2-imidazolone is represented by the following formula:

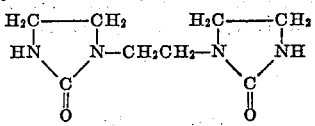

EXAMPLE VIII

The procedure set forth in Example I was repeated using 25 g. of diethylenetriamine, 11.7 g. of sulfur, 200 ml. of methanol and an amount of CO to pressure the bomb to 110 p. s. i. g. The reaction was carried out for 20 min. at 120° C. 1,3-bis(2-imidazolidonyl-2-ethyl-urea was obtained having a melting point of 165°–167° C. and the following chemical analysis:

|  | Carbon | Hydrogen | Nitrogen |
|---|---|---|---|
|  | Percent | Percent | Percent |
| Calculated for: $C_{11}H_{20}N_6O_3$ | 46.47 | 7.09 | 29.55 |
| Actual | 46.48 | 6.88 | 29.01 |

1,3-bis(2-imidazolidonyl-2-ethyl)urea is represented by the following formula:

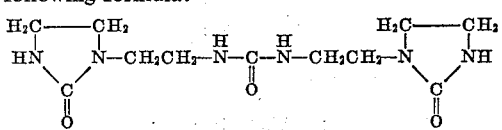

EXAMPLE IX

To a 2.1 stainless steel autoclave was charged 108 g. of m-phenylenediamine, 10.9 g. of triethylamine, 64 g. of sulfur and an amount of CO to pressure the autoclave to 450 p. s. i. g. With stirring, the autoclave was heated to 120° C. for four hours. The contents were then removed and unreacted amine extracted with hot methanol. An 18% yield of poly-m-phenyleneurea having a melting point above 300° C. was obtained. The repeating unit of the polymer is represented by the formula:

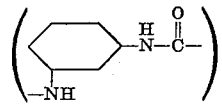

EXAMPLE X

To a 1.8 l. stainless steel bomb was charged 13.8 g. of 2,4,6-triaminotoluene, 9.7 g. of sulfur, 450 ml. of methanol and an amount of CO to pressure the bomb to 100 p. s. i. g. The reaction was carried out at 115° C. for 3½ hours. The contents of the bomb were evaporated to about 200 ml. to precipitate the polymer. A 26% yield of a cross-linked polymer having a melting point of 310° C. was obtained.

EXAMPLE XI

To a 1 l. autoclave was charged 30 g. of 2,4-diaminophenol hydrochloride, 9.76 g. of sulfur, 54.2 g. of triethylamine and CO to a pressure of 100 p. s. i. g. The autoclave was heated to 115° C. for 3½ hours. The polymer was washed with benzene, water and dilute HCl and a 72% yield (24.5 g.) of poly-m-(4-hydroxyphenylene)urea recovered. The repeating unit of this polymer is represented as follows:

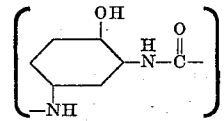

EXAMPLE XII

To a 1 l. autoclave was charged 28.2 g. of benzidine, 9.76 g. of sulfur, 54.2 g. of triethylamine and CO to a pressure of 100 p. s. i. g. The mixture was maintained at 115° C. for 3½ hours. The product was washed with dilute HCl and a Na₂S—NaOH solution and a 46% yield (14.6 g.) of poly-p,p'-biphenylenurea obtained melting above 300° C. The repeating unit of this polymer is represented by the formula:

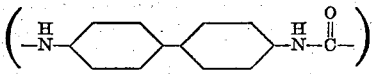

EXAMPLE XIII

The procedure of Example XII was repeated using 32.4 g. of o-tolidine, 9.76 g. of sulfur, 54.2 g. of triethylamine and CO to a pressure of 100 p. s. i. g. The reaction was carried out at 115° C. for 3½ hours. A 54% yield (14.5 g.) of poly-4,4'-(3,3'-dimethylbiphenylene)urea having a melting point above 300° C. was obtained. The repeating unit of this polymer is represented by the formula:

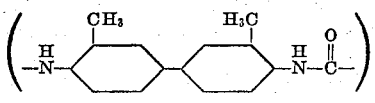

EXAMPLE XIV

The procedure of Example XII was repeated using 30 g. of 2,4-diaminotoluene, 24 g. of sulfur, 2.5 g. of triethylamine, 150 ml. of methanol and CO to a pressure of 300 p. s. i. g. The reaction was run for 3½ hours at 115° C. A 10% yield (3 g.) of poly-m-(4-methylphenylene)urea was obtained having a decomposition point above 300° C. The repeating unit of this polymer is represented by the formula:

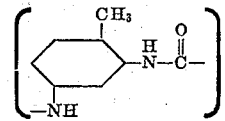

EXAMPLE XV

The procedure set forth in Example XII is repeated using 25 g. of o-dianisidine, 9.8 g. of sulfur, 54.2 g. of triethylamine and CO to a pressure of 250 p. s. i. g. The reaction was run for 3 hours at 115° C. A 11% yield (3.0 g.) of poly-4,4'-(3,3'-dimethoxybiphenylene)-urea was obtained having a decomposition point of 230° C. The repeating unit of this polymer is represented by the formula:

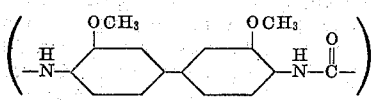

EXAMPLE XVI

The same general procedure of Example XII was repeated using the 2 l. Parr bomb and 88 g. of bis-3-(aminopropyl) ether, 21.2 g. of sulfur, 400 ml. of methanol and CO to a pressure of 700 p. s. i. g. The reaction was carried out at 120° C. for 4 hours. A 100% yield (105 g.) of poly-(ditrimethyleneoxy)urea was obtained having a melting point of 191°–193° C. As determined from the specific viscosity of a 1.0 g. sample of the polymer in 100 ml. of 95% $H_2SO_4$ at 25° C., the polymer had a degree of polymerization of 20. The repeating unit of this polymer is represented by the formula:

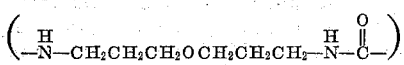

EXAMPLE XVII

To a two gallon autoclave was added 486 g. of p-phenylenediamine, 432 g. of sulfur, 271 g. of triethylamine, 900 ml. of pyridine and CO to a pressure of 500 p. s. i. g. The reaction was carried out for 2 hours at 118° C. The reaction product was then washed twice with $CS_2$, once with a concentrated $Na_2S$ solution and then refluxed with a concentrated $Na_2S$ solution. The polymer was then washed twice with water and dried. A 100% yield (600 g.) of poly-p-phenyleneurea was obtained having a degree of polymerization of 14 and a molecular weight of 1876. The repeating unit of this polymer is represented by the formula:

EXAMPLE XVIII

The following polyureas were prepared in a 100 ml. bomb. In each case there was employed 0.017 mole of diamine, 0.017 mole of sulfur, 20 ml. of methanol and CO to a pressure of 500 p. s. i. g. The results are indicated in the following Table I. Degree of polymerization (DPn) was determined from the specific viscosity of 1.0 g. of the polymer in 100 ml. of 95% $H_2SO_4$ at 25° C.

reaction" is meant groups which do not prevent the formation of any of the desired urea. Such substituent groups include alkyl, aryl, cycloalkyl, alkenyl, carboxy, hydroxy, thiol, cyano, halogen, including chlorine, bromine, fluorine and iodine, alkoxy, aryloxy, organosily, polysiloxanyl, alkylamino, dialkylamino, etc. Organic diamines containing 18 or more carbon atoms can be used. Size of the organic diamine in this regard is not critical.

Although not essential, it is desirable in most cases to carry out the process in the presence of an inert solvent or diluent. Aliphatic alcohols, particularly methanol, are preferred for this purpose as they are easy to separate and recover from the urea product, e. g. by evaporation, and they are solvents for many of the amines. Aromatic and aliphatic hydrocarbons, chlorinated hydrocarbons, ethers, tertiary amines and acid amides are also suitable. Water per se is not a satisfactory diluent although small amounts of water in the organic diluent can be tolerated. Where a diluent is employed, an amount sufficient to slurry the reactants is usually sufficient. It is also preferred, but not necessary, to have a diluent in which the reactants are soluble. In preparing ureas of the class described, the use of excessively large amounts of solvent should be avoided.

Although not intended to be limitative, in addition to methanol, the following solvents or diluents can be employed in carrying out the process: ligroin, isopropanol, isopropyl ether, ethanol, mineral oil, triethylamine, pyridine, isopropanol-water, ethylene glycol, methyl Cellosolve, tetrahydrofurfuryl alcohol, N,N-dimethylaniline, N,N-diethylethanolamine, formamide, amyl alcohol, and benzene.

In general the novel process of this invention requires no added catalyst. The reaction proceeds in an alkaline medium and in most cases the amines employed provide sufficient alkalinity. In the case of the use of aromatic organic diamines, an alkaline catalyst, although not absolutely required, has been employed to advantage. Alkaline catalysts having dissociation constants greater than $1 \times 10^{-10}$ are preferred. It is to be noted, however, that while in the preparation of this type of urea, an alkaline catalyst is desirable, it is not absolutely necessary. In the absence of added alkaline catalysts of the type discussed herein, the reaction still proceeds but with lower yields.

Strong and weak inorganic bases appear to initiate the reaction about equally as well, although the resulting yields of the urea are inferior to the preferred tertiary amine. Inorganic hydroxides, alkaline inorganic and organic salts and tertiary aliphatic amines are useful as catalysts. Tertiary alkylamines are preferred.

The amount of catalyst to be added to assist in initiating the reaction will vary depending upon the compound selected. From about 0.002 to about 0.2 mole of the alkaline catalyst per mole of aromatic diamine is particularly useful although significantly greater quantities of catalyst, as shown by the examples can be used if desired.

The quantities of reactants used in this process can be varied substantially without departing from the scope of the invention. In general at least stoichiometric proportions of reactants should be used. Excessive quantities

*Table 1*

| Diamine reactant | Reaction temp., ° C. | Reaction time, hrs. | Polymer produced | Yield percent | DPn | Softening point, ° C. |
|---|---|---|---|---|---|---|
| Hexamethylenediamine | 120 | 4 | Polyhexamethyleneurea | 73 | 22 | |
| Do | 140 | 2 | do | 59 | 30 | |
| Do | 160 | 1 | do | 49 | 6 | |
| Octamethylenediamine | 160 | 1 | Polyoctamethyleneurea | 71 | 12 | 240-255 |
| Decamethylenediamine | 160 | 1 | Polydecamethyleneurea | 80 | 7 | 240 |
| Dodecamethylenediamine | 160 | 1 | Polydodecamethyleneurea | 83 | 6 | 200-210 |

In addition to the organic diamines used in the preceding examples, organic diamines substituted with one or more substituents, in addition to those already illustrated, and which are not deleteriously reactive under the conditions of the reaction, can be used in the reaction of this invention. By the expression groups "which are not deleteriously reactive under the conditions of the of any of the reactants can be used as desired. The process has been found to be particularly operable using molar ratios of organic diamine to sulfur ranging from 0.1:1 to 8:1. Even higher ratios have been used with good results. Generally the particular ratio of reactants will be dictated more by economic considerations than by reactivity considerations.

The quantity of carbon monoxide used in the process can be varied substantially with it being employed in excess of the stoichiometric proportion and the excess being governed primarily by the pressure desired.

The process of this invention is operable over an exceptionally wide pressure range. It can be operated at atmospheric pressure although the reaction proceeds much more rapidly at elevated pressures. Generally pressure from about 30 p. s. i. a. (pounds per square inch absolute) to about 1500 p. s. i. a. are applicable. Higher pressures can be used, if desired, but offer no advantage.

The process of this invention can be carried out over a wide temperature range. It is preferably carried out at an elevated temperature. Temperatures ranging from about 60° to about 300° C. have been found applicable. Generally, reaction temperatures in the range from about 60° C. to about 160° C. are preferred being varied slightly depending upon the urea produced. This application is a continuation-in-part of co-pending application Serial No. 593,040, filed June 22, 1956, now abandoned.

What is claimed is:

1. A process for preparing cyclic and polymeric ureas which comprises mixing carbon monoxide, sulfur and a compound selected from the group consisting of organic compounds containing at least two —NH₂ substituent radicals attached to different carbon atoms and organic compounds containing at least one —NH₂ substituent radical and at least one —NH— substituent radical attached to different carbon atoms and subjecting the resultant mixture to a temperature in the range of from about 60° C. to about 300° C. and a pressure of at least 30 p. s. i. a. for a time sufficient to produce the urea.

2. A process as described in claim 1 wherein the resultant mixture is subjected to a temperature in the range from about 60° C. to about 160° C. and a pressure of at least 30 p. s. i. a.

3. A process as described in claim 2 wherein the reaction is carried out in an inert diluent.

4. A process which comprises mixing carbon monoxide, sulfur and 1,4-diaminobutane and subjecting the resultant mixture to a temperature in the range from about 60° C. to about 160° C. and a pressure of at least 30 p. s. i. a. for a time sufficient to produce tetramethyleneurea.

5. A process which comprises mixing carbon monoxide, sulfur and o-phenylenediamine and subjecting the resultant mixture to a temperature in the range from about 60° C. to about 160° C. and a pressure of at least 30 p. s. i. a. for a time sufficient to produce benzimidazolone.

6. A process which comprises mixing carbon monoxide, sulfur and p-phenylenediamine and subjecting the resultant mixture to a temperature in the range from about 60° C. to about 160° C. and a pressure of at least 30 p. s. i. a. for a time sufficient to produce poly-p-phenyleneurea.

7. A process which comprises mixing carbon monoxide, sulfur and bis-3-(aminopropyl) ether and subjecting the resultant mixture to a temperature in the range from about 60° C. to about 160° C. and a pressure of at least 30 p. s. i. a. for a time sufficient to produce poly-(di-trimethyleneoxy)urea.

8. A process which comprises mixing carbon monoxide, sulfur and hexamethylenediamine and subjecting the resultant mixture to a temperature in the range from about 60° C. to about 160° C. and a pressure of at least 30 p. s. i. a. for a time sufficient to produce polyhexamethyleneurea.

References Cited in the file of this patent

UNITED STATES PATENTS

| 2,615,025 | Lutz | Oct. 21, 1956 |
| 2,820,024 | Kerk | Jan. 14, 1958 |

FOREIGN PATENTS

| 679,671 | Great Britain | Sept. 24, 1952 |

OTHER REFERENCES

Hagelock: Chem. Abstracts, vol. 44, cols. 9937–8.
Uno et al.: Chem. Abstracts, vol. 47, col. 386.